United States Patent
Tredoux et al.

(10) Patent No.: US 9,454,715 B2
(45) Date of Patent: Sep. 27, 2016

(54) METHODS AND SYSTEMS FOR TRANSPARENTLY EXTENDING A MULTIFUNCTION DEVICE TO A MOBILE COMMUNICATIONS DEVICE

(71) Applicant: Xerox Corporation, Norwalk, CT (US)

(72) Inventors: Gavan Tredoux, Penfield, NY (US); Phillip Emmett, Rochester, NY (US); Premkumar Rajendran, Pondicherry (IN); Peter Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/766,364

(22) Filed: Feb. 13, 2013

(65) Prior Publication Data

US 2014/0226171 A1    Aug. 14, 2014

(51) Int. Cl.
*G06K 15/02* (2006.01)
*G06F 3/12* (2006.01)
*H04N 1/00* (2006.01)
*G06K 15/00* (2006.01)

(52) U.S. Cl.
CPC ........... *G06K 15/002* (2013.01); *G06F 3/1203* (2013.01); *G06F 3/1225* (2013.01); *G06F 3/1236* (2013.01); *G06F 3/1292* (2013.01); *H04N 1/00225* (2013.01); *H04N 1/00307* (2013.01); *H04N 1/00962* (2013.01); *H04N 2201/0094* (2013.01); *H04N 2201/3205* (2013.01); *H04N 2201/3269* (2013.01); *H04N 2201/3273* (2013.01)

(58) Field of Classification Search
CPC .................................................. G06K 15/4005
See application file for complete search history.

(56) References Cited

U.S. PATENT DOCUMENTS

| | | | |
|---|---|---|---|
| 7,899,950 B2 | 3/2011 | Lorenzo et al. | |
| 2004/0192210 A1 | 9/2004 | Park | |
| 2005/0198284 A1* | 9/2005 | Bunn et al. | 709/225 |
| 2005/0286540 A1* | 12/2005 | Hurtta et al. | 370/401 |
| 2006/0179169 A1* | 8/2006 | Yamada | H04N 1/00347 710/8 |
| 2008/0077725 A1* | 3/2008 | Yabuki | 710/305 |
| 2008/0150952 A1* | 6/2008 | Koarai | G06F 9/4443 345/531 |
| 2009/0144629 A1* | 6/2009 | Ferlitsch et al. | 715/736 |
| 2010/0225962 A1* | 9/2010 | Okigami et al. | 358/1.15 |
| 2011/0157624 A1* | 6/2011 | Nishikawa | 358/1.15 |
| 2012/0008161 A1 | 1/2012 | Rouhana | |

(Continued)

FOREIGN PATENT DOCUMENTS

JP            11-032154    *    2/1999    ............... H04N 1/00

*Primary Examiner* — Beniyam Menberu
(74) *Attorney, Agent, or Firm* — Kevin Soules; Kermit D. Lopez; Luis M. Ortiz

(57) ABSTRACT

Methods and systems for transparently extending a multi-function device onto a mobile communications device. The mobile communications device and the multi-function device can be securely connected utilizing a random code displayed on a user interface of the MFD. An extensibility application associated with the MFD can be transparently combined with an execution environment of the mobile communications device to offer a number of services. A hardware and software resource of the MFD and the mobile communications device can be combined to perform composite operations involving data from both devices. The connection can expire after a period of inactivity and require physical proximity to be established to prevent unwanted access to the MFD. Such an approach establishes a shared extensibility framework for the multifunction device and the mobile communications device as a single execution environment.

20 Claims, 9 Drawing Sheets

(56) References Cited

U.S. PATENT DOCUMENTS

| | | |
|---|---|---|
| 2012/0033248 A1 | 2/2012 | Farrell |
| 2012/0050777 A1* | 3/2012 | Matsumoto ................ 358/1.13 |
| 2012/0140261 A1 | 6/2012 | DeRoller |
| 2012/0243029 A1* | 9/2012 | St. Jacques et al. ........ 358/1.15 |
| 2012/0274962 A1* | 11/2012 | Thomas ............. H04N 1/00015 358/1.12 |
| 2012/0284322 A1* | 11/2012 | Laborczfalvi et al. ....... 709/202 |
| 2013/0021643 A1* | 1/2013 | Nuggehalli et al. ......... 358/1.15 |
| 2013/0093904 A1* | 4/2013 | Wagner et al. .......... 348/207.11 |
| 2013/0114100 A1* | 5/2013 | Torii et al. .................... 358/1.14 |

\* cited by examiner

METHODS AND SYSTEMS FOR TRANSPARENTLY EXTENDING A MULTIFUNCTION DEVICE TO A MOBILE COMMUNICATIONS DEVICE

FIELD OF THE INVENTION

Embodiments are generally related to multi-function devices such as printers, scanners, photocopy machines, and the like. Embodiments are also related to mobile communications devices such as Smartphones, pad computing devices, and so forth. Embodiments are additionally related to the extension of the multi-function devices to mobile communications devices.

BACKGROUND

A MFD (Multi-Function Device) is a rendering device or office machine, which incorporates the functionality of multiple devices in one apparatus or system so as to have a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth. A networked MFD generally can interact with an assemblage of varying rendering devices, client computers, servers, and other components that are connected to and communicate over a network.

Various programs can be executed on a MFD to extend its functionality, offer user interface customization and integration between the MFD and other services based on a private enterprise network, or offered publically through the Internet. Extensibility applications, for example, can be configured and implemented via a MFD to take advantage of services offered by the MFD itself, such as the ability to execute a scan, copy or print job. Such services can be invoked by an application programmer as part of overall user experience offered, assuming that they are on the machine the application is executing on. Since the services are on the device itself, no network discovery or configuration is required when using the services (that is, they are always available on a local host). If the application wishes to utilize other hardware and resources, assuming that these can be reached over a network connection, special measures need to be taken to discover and establish communication with those services. Such an approach imposes a burden on the application subjecting it to configuration contingencies.

A mobile communications device such as a Smartphone offers additional hardware, for example, sensors, storage, user data and services. MFD features can be controlled from a mobile communications device to perform composite operations, or vice-versa. Conventionally, the devices are disconnected and do not operate as a composite system, making it difficult to achieve a hybrid workflow.

Based on the foregoing, it is believed that a need exists for an improved method and system for transparently extending a multi-function device onto a mobile communications device, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing a MFD.

It is another aspect of the disclosed embodiments to provide for an improved method and system for transparently extending a multi-function device onto a mobile communications device.

The aforementioned aspects and other objectives and advantages can now be achieved as described herein. Methods and systems for transparently extending a multi-function device onto a mobile communications device are disclosed herein. The mobile communications device and the multi-function device can be securely connected utilizing a random code (e.g., QR code/PIN number combination or a near-field communication (NFC) chip) displayed on a user interface, or attached to the body of the MFD. An extensibility application associated with the MFD can be transparently combined with an execution environment of the mobile communications device to offer a number of services (e.g., scan, copy, fax, voice recording, accelerometer reading, GPS positioning, and so on). A hardware and software resource of the MFD and the mobile communications device can be combined to perform composite operations involving data from both devices. The connection can expire after a period of inactivity and require physical proximity to be established to prevent unwanted access to the MFD. Such an approach establishes a shared extensibility framework for the multifunction device and the mobile communications device as a single execution environment.

A random code can be displayed on a display screen associated with the MFD to invite the mobile communications device to form a hybrid device, if a button on the MFD is pressed. The mobile communications device can be elected to join by utilizing the displayed code on the MFD. A user can initiate an application on a mobile communications device to connect to the MFD. The mobile communications device utilizing an image-capturing unit associated with the mobile communications device can read the displayed code. The MFD extensibility application (or list of apps to launch) can be displayed on the user interface of the mobile communications device and/or the MFD.

The MFD extensibility application (e.g., EIP extensibility application) can be executed and can have access to services on the MFD and services and sensors on the mobile communications device. When the extensibility application exits, the session may either be exited and/or permitted to expire due to inactivity, depending on a user preference. If the extensibility application is run on the MFD without involving the mobile communication, it simply loses access to an extra resource offered by the mobile communications device, and may degrade gracefully.

In one implementation, the mobile communications device and the multi-function device can be indirectly connected via a shared rendezvous point (e.g., the Internet). When the extensibility application is executed, the application calls a reference service that is automatically run on hardware. The reference service can be transparently and automatically tunneled through the rendezvous point from the mobile communications device to the MFD. In another implementation, the mobile communications device and the MFD can be directly connected through a shared network if the device is too primitive to have an extensibility framework of its own (a so-called "A4" device).

The extensibility application can also run on the mobile communications device inside a web browser and transparently rewriting Extensibility API requests to the MFD services so that they are run on the MFD rather than on the mobile communications device. A network translation service can also be employed in combination with the web browser on the mobile communications device to perform URL rewriting on the extensibility application by correctly routing Extensibility API calls to a correct destination. The calls to mobile resources can be tunneled back through the rendezvous point to the mobile communications device and run there if the extensibility application is displayed on the MFD (rather than the mobile) screen so that the direction is reversed (the mobile augments the MFD rather than the MFD augments the mobile). The application can also utilize the GPS capabilities of the mobile communications device to set a SNMP (Simple Network Management Protocol) location configuration of the MFD to accurate values, acting on the GPS services.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
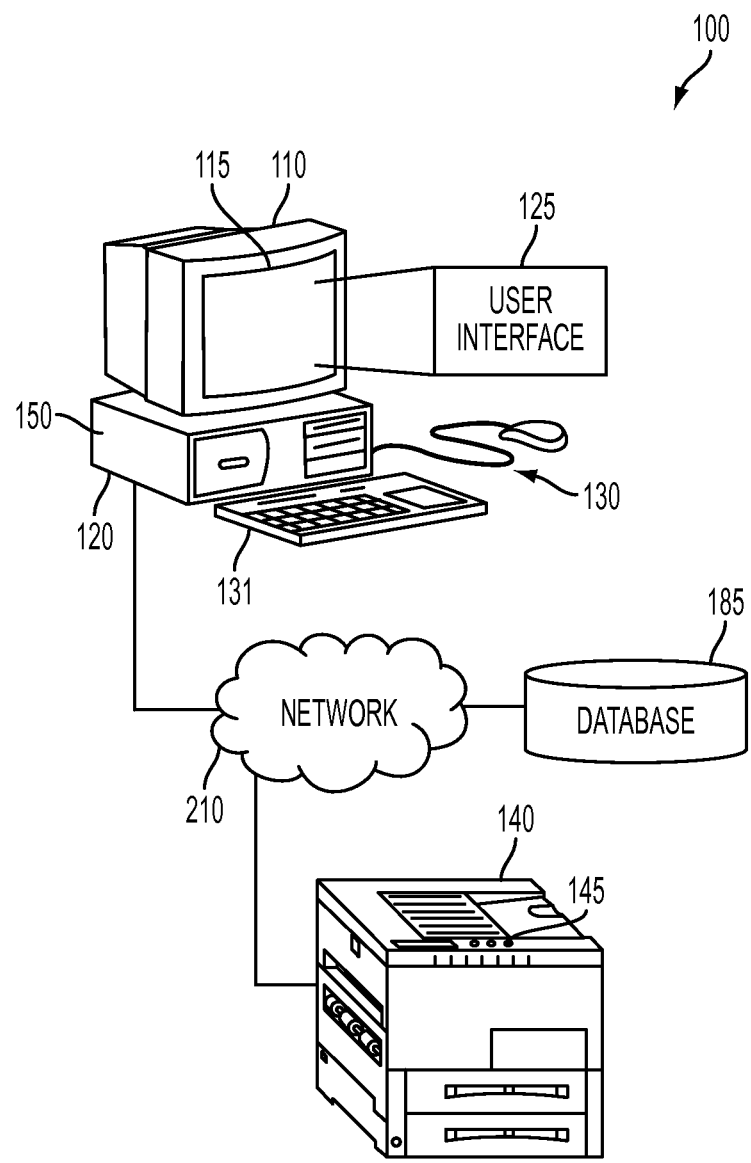
FIG. 1 illustrates an example of a multi-function device coupled to a data-processing apparatus through a network, in accordance with the disclosed embodiments.

Referring to FIG. 1, system 100 can be configured to include one or more networked devices, such as networked device 140, coupled to a data-processing apparatus 110 through a network 210. In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like).

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions such as scanning, faxing, printing, and copying.

The data-processing apparatus 110 can be coupled to the MFD 140 (and other rendering devices) through a computer network 210. The computer network 210 may employ any network topology, transmission medium, or network protocol. The computer network 210 may include connections such as wire, wireless communication links, or fiber optic cables. In the depicted example, the computer network 210 is the Internet representing a worldwide collection of networks and gateways that use the Transmission Control Protocol/Internet Protocol (TCP/IP) suite of protocols to communicate with one another. At the heart of the Internet is a backbone of high-speed data communication ones between major nodes or host computers, consisting of thousands of commercial, government, educational, and other computer systems that route data and messages.

The networked MFD 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also includes a GUI 125 for communicating rendering features for processing, for example, the rendering job to a user and accepting the user's selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the disclosed embodiments, which can be embodied in the context of the data-processing apparatus 110 and the networked device 140 depicted in FIG. 1. The disclosed embodiments, however, is not limited to any particular application or any particular environment. Instead, those skilled in the art will find that the system and methods of the disclosed embodiments may be advantageously applied to a variety of system and application software including database management systems, word processors, and the like. Moreover, the present invention may be embodied on a variety of different platforms including Macintosh, UNIX, LINUX, Android, Apple iOS, and the like. Therefore, the description of the exemplary embodiments, which follows, is for purposes of illustration and not considered a limitation.

Figure 2:
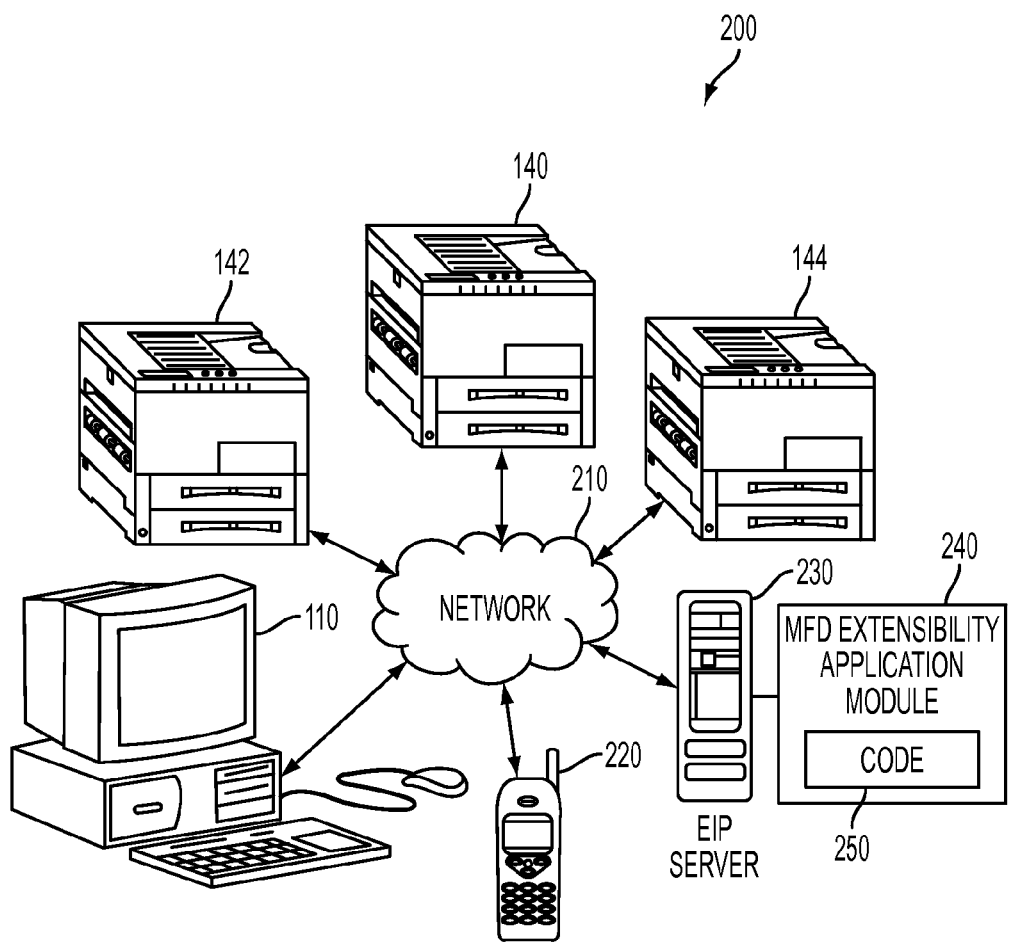
FIG. 2 illustrates a graphical representation of a device management system having a MFD extensibility application module associated with a network, in accordance with the disclosed embodiments.

FIG. 2 illustrates a graphical representation of a device management system 200 having a MFD extensibility application module 240 associated with a network 210, in accordance with the disclosed embodiments. The device management system 200 generally includes the network infrastructure 210 associated with one or more networked MFDs 140, 142, and 144, data-processing system 110, a mobile communications device 220, and an EIP server 230. Data-processing apparatus 110 depicted in FIG. 1 can be, for example, a server. Other devices such as, for example, desktops, network devices, palmtops, mobile phones, etc., may also be included in the network 210 as service providers. The MFDs 140, 142, and 144 can be located remotely with respect to each other, or alternatively, they may be located locally with respect to each other.

The typical MFD may act as a combination of a printer, scanner, photocopier, fax, and e-mail. While three MFDs 140, 142, and 144 are shown by way of example, it is to be appreciated that any number of MFDs may be linked to the network such as, four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

The MFD extensibility application module 240 associated with the EIP server 230 can be adapted for transparently extending the MFDs 140, 142, and 144 onto the mobile communications device 220. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
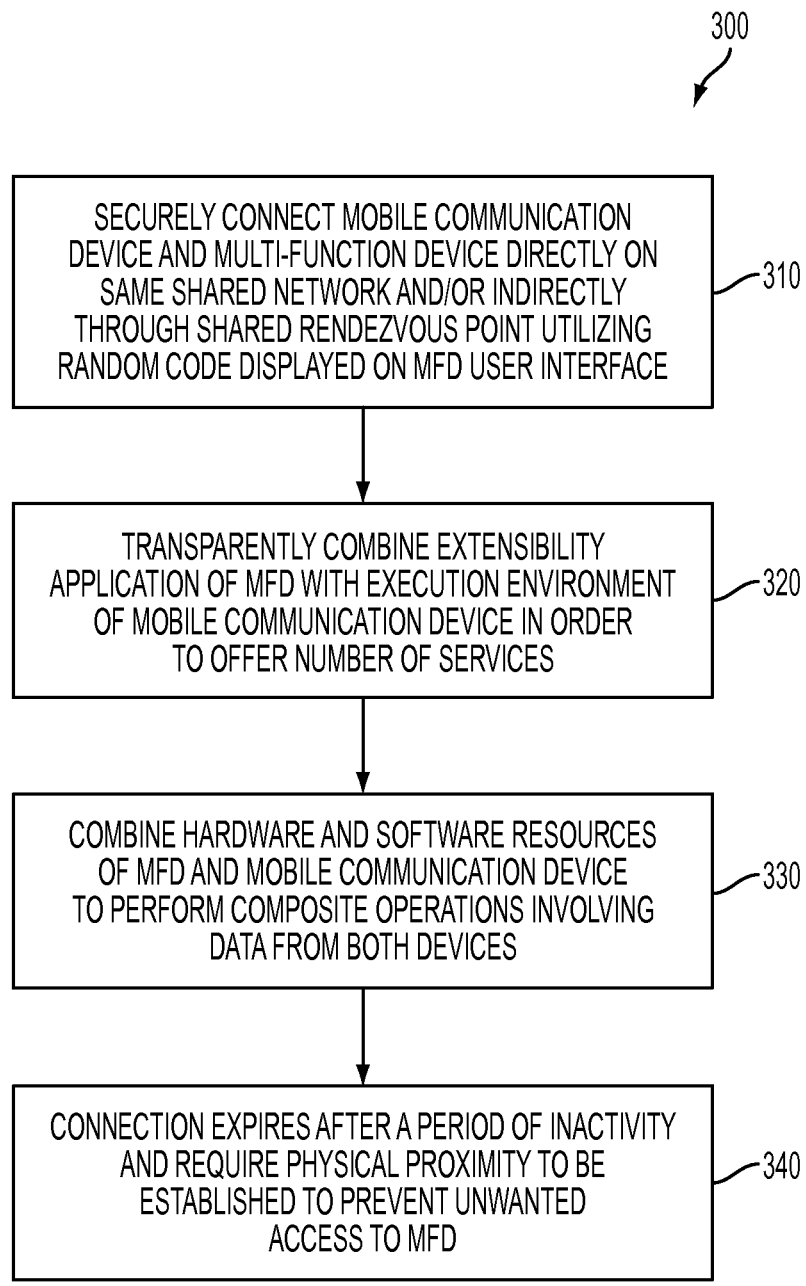
FIG. 3 illustrates a high level flow chart of operations illustrating logical operational steps of a method for transparently extending a MFD onto a mobile communications device, in accordance with the disclosed embodiments.

FIG. 3 illustrates a high level flow chart of operations illustrating logical operational steps of a method 300 for transparently extending the multi-function device 140 onto the mobile communications device 220, in accordance with the disclosed embodiments. Note that in FIGS. 1-10, identical or similar blocks are generally indicated by identical reference numerals. Initially, as indicated at block 310, the mobile communications device 220 and the multi-function device 140 can be connected directly/indirectly utilizing a random code 250 displayed on the user interface 145 of the MFD 140.

The extensibility application module 240 associated with the MFD 140 can be transparently combined with an execution environment of the mobile communications device 220 to offer a number of services, as shown at block 320. Note that the services can be, for example, scan, copy, fax, voice recording, accelerometer reading, GPS positioning, and so on. A hardware and software resource of the MFD 140 and the mobile communications device 220 can be combined to perform composite operations involving data from both devices 140 and 220, as indicated at block 330. The connection can expire after a period of inactivity and require physical proximity to be established to prevent unwanted access to the MFD 140, as illustrated at block 340.

Figure 4:
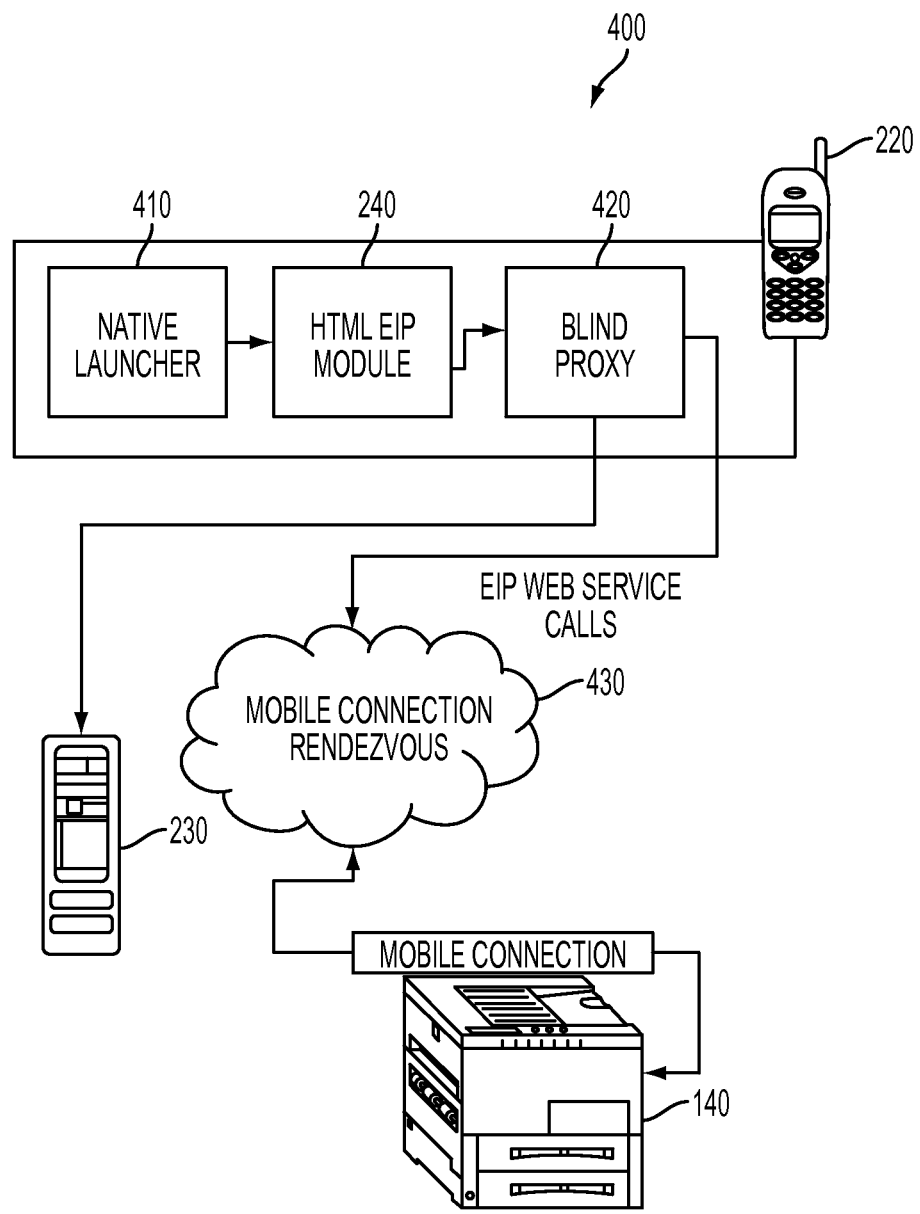
FIG. 4 illustrates a block diagram of the device management system having the MFD indirectly connected to the mobile communications device via a shared rendezvous point, in accordance with the disclosed embodiments.

FIG. 4 illustrates a block diagram of a device management system 400 having the MFD 140 indirectly connected to the mobile communications device 220 via a shared rendezvous point 430, in accordance with the disclosed embodiments. The mobile communications device 220 includes a native launcher 410 and a blind proxy 420. The EIP server 230 can be connected to the network 430 or can be placed locally. For example, the hybrid MFD/mobile device can be established as shown in FIG. 4 utilizing the EIP extensibility application module 240 running on the MFD 140. In general, EIP is a software platform upon which developers can use standard web-based tools to create server-based applications that can be configured for the MFP's touch-screen user interface.

The communication between the mobile communications device 220 and the MFD 140 can be forwarded through the rendezvous point 430 utilizing well-known techniques. When the EIP extensibility application module 240 is executed, the application module 240 calls reference services that are automatically run on the correct hardware. For example, a scan operation can be satisfied by the MFD 140, but microphone services can be provided by the mobile communications device 220 and are transparently and automatically tunneled through the rendezvous point 430 from the mobile communications device 220 to the MFD 140.

Figure 5:
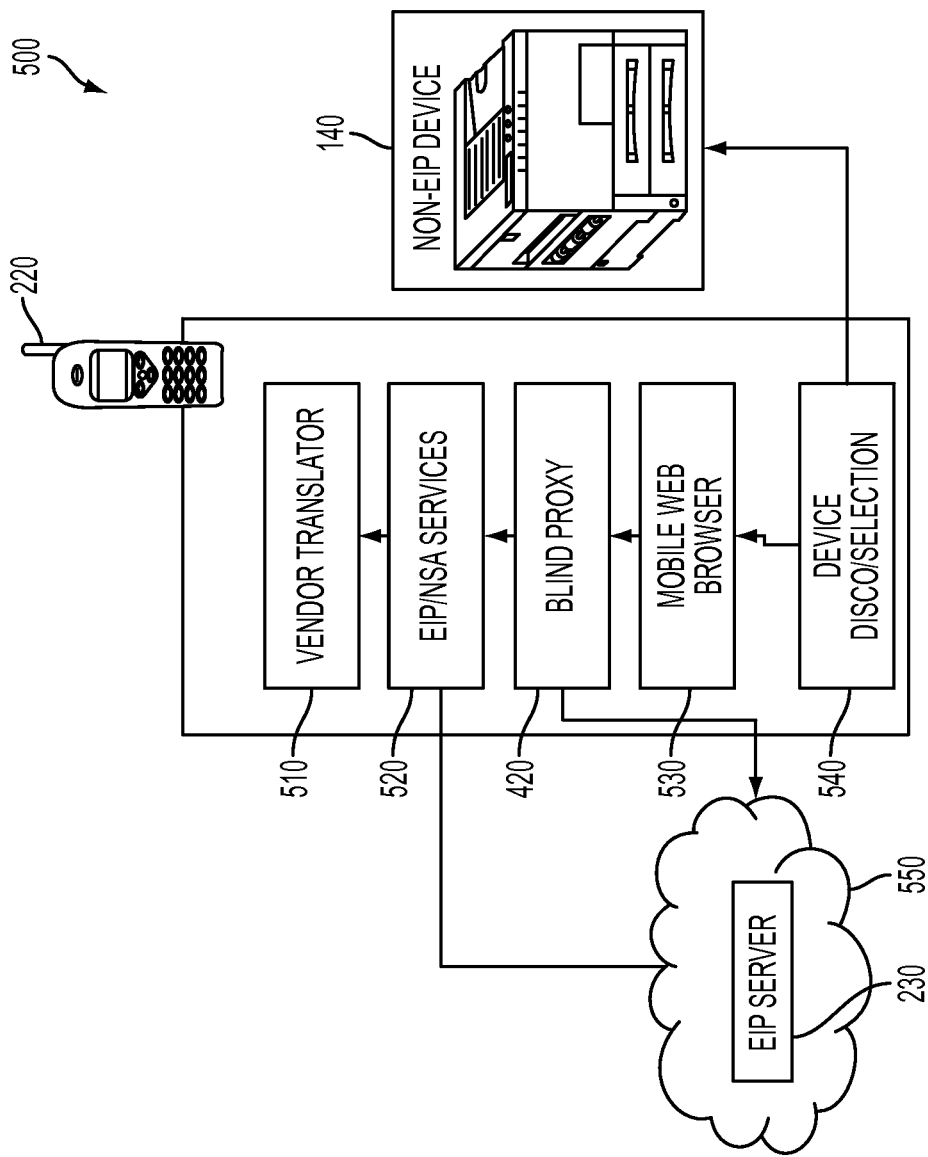
FIG. 5 illustrates a block diagram of the device management system having the MFD directly connected to the mobile communications device, in accordance with the disclosed embodiments.

FIG. 5 illustrates a block diagram of a device management system 500 having the MFD 140 directly connected to the mobile communications device 220, in accordance with the disclosed embodiments. The mobile communications device 220 includes a vendor translator 510, EIP services 520, a mobile web browser 530, and a device disconnection/selection 540. FIG. 5 shows an analogous setup for the directly connected case which does not require the rendezvous point 430. Note that the MFD 140 in FIG. 5 is too primitive to provide an extensibility framework of its own and acquires one through the collaboration. Similarly, the mobile communications device 220 acquires the features of the MFD 140 like its scanner and printer. Again, the extensibility application 240 can be programmed as if it is running on a hybrid machine which offers the combined services of both.

Figure 6:
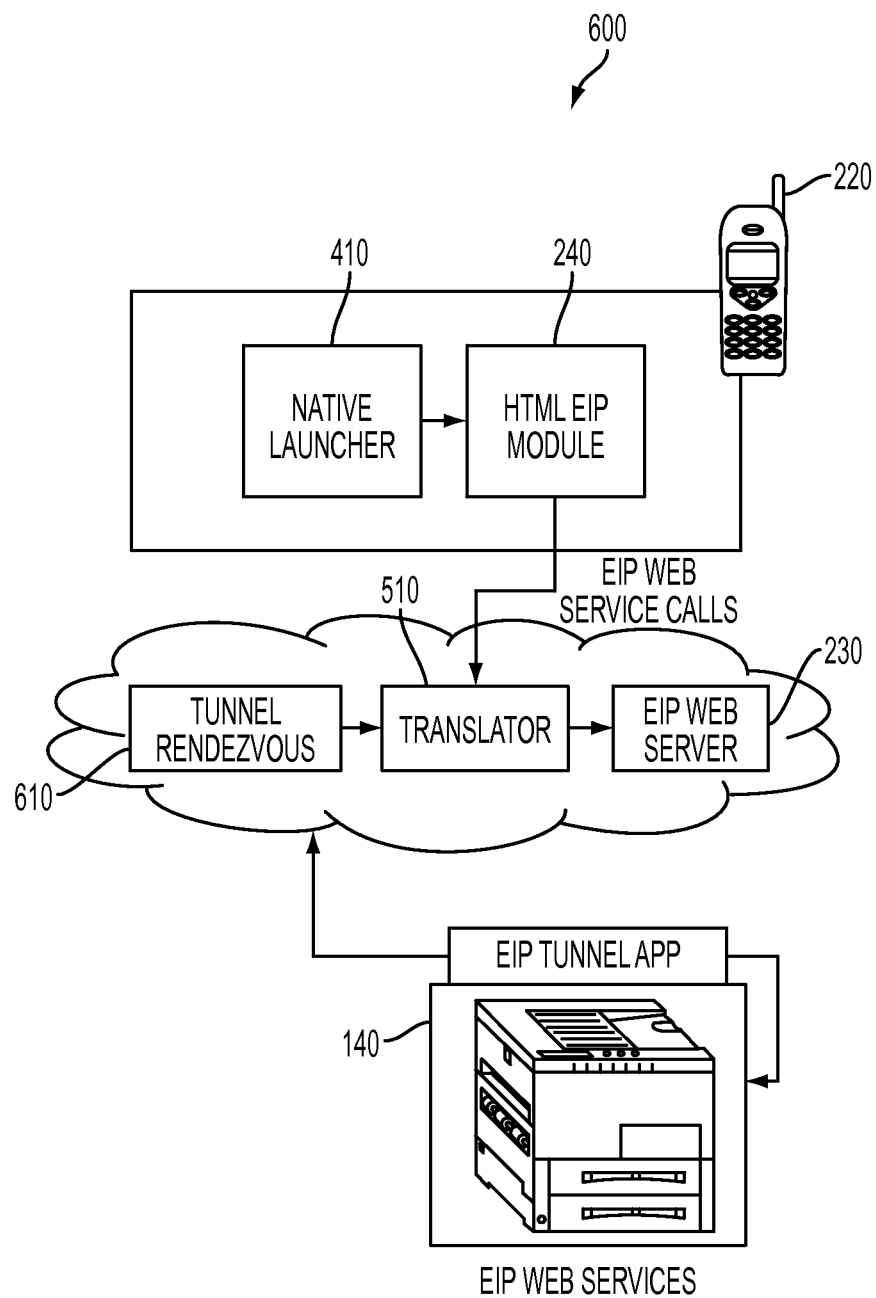
FIG. 6 illustrates a block diagram of the device management system having the MFD connected to the mobile communications device via a translator, in accordance with the disclosed embodiments.

FIG. 6 illustrates a block diagram of a device management system 600 having the MFD 140 connected to a mobile communications device 220 via the translator 510, in accordance with the disclosed embodiments. The extensibility application 240 can run on the mobile communications device 220 inside the web browser 530 and transparently rewrite the Extensibility API requests to the MFD services, which form the basis of the Extensibility application 240 so that they are run on the MFD 140 rather than on the mobile communications device 220. For example, when a "scan" service is invoked, instead of running on "local host" where it can run directly on the MFD 140, the call can be translated automatically so that it can transmit via a rendezvous tunnel 610 to the MFD 140 on the other end of the connection. The requests that utilize the mobile resources can be left as-is and the mobile communications device 220 and the MFD 140 merge their functionality.

The translation service 510 can be employed in combination with the web browser 530 on the mobile communications device 220 to perform URL rewriting on the Extensibility APIs called by application 240 to establish the hybrid machine by correctly routing calls to a correct destination. Similarly if the extensibility application 240 is shown in the MFD user interface 145, with the direction reversed: the calls to the mobile communications device 220 can be tunneled back through the rendezvous point 430 to the mobile communications device 220 and run there. The application module 240 can utilize the GPS capabilities of the mobile communications device 220 to set the MFD's SNMP location configuration to accurate values, acting on the GPS services as part of the hybrid machine.

Figure 7:
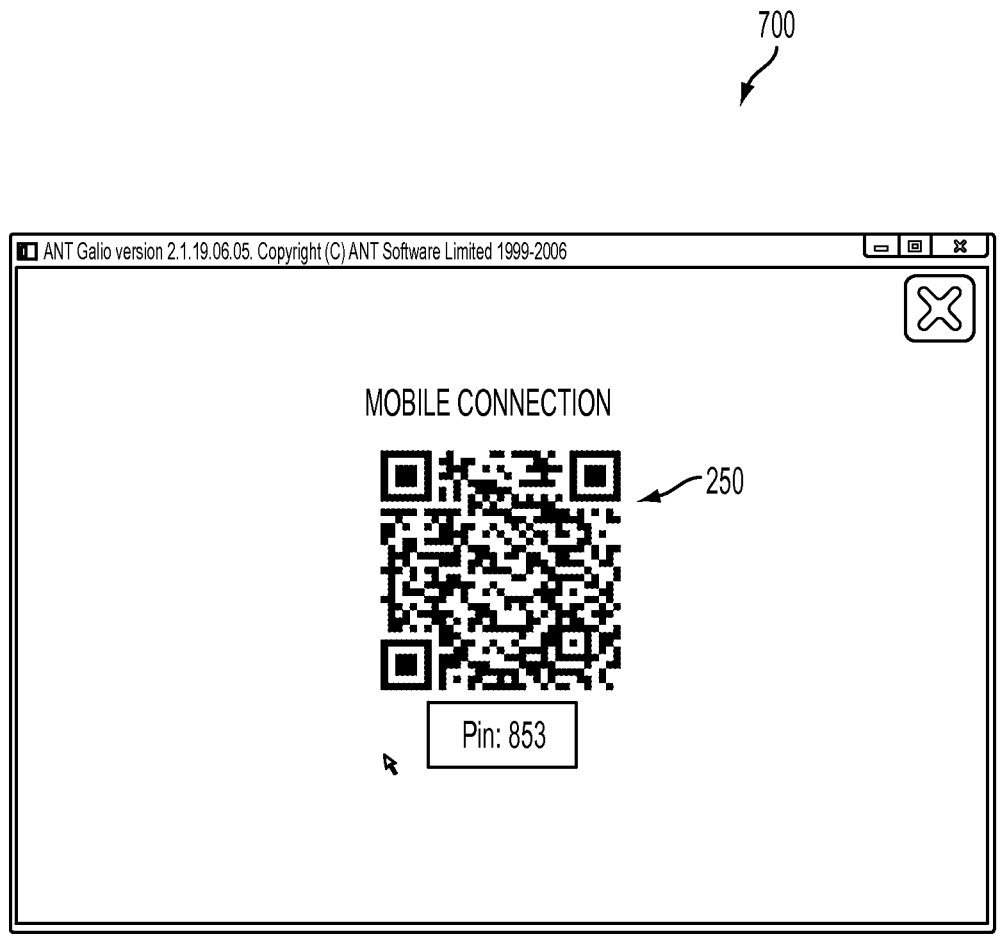
FIG. 7 illustrates a GUI of the MFD showing a code to invite the mobile communications device to form a hybrid device, in accordance with the disclosed embodiments.

FIG. 7 illustrates a GUI (Graphical User Interface) 700 of the MFD 140 showing the code 250 to invite the mobile communications device 220 to form a hybrid device, in accordance with the disclosed embodiments. A user can press a button on the MFD 140 to extend the MFD 140 to the mobile communications device 220 if the user of the MFD 140 is standing in front of the MFD 140, and is also holding the mobile communications device 220. For example, the button can be labeled "Use my mobile". Note that the mobile communications device 220 can be implemented as the EIP extensibility application module 240. The random code 250 can be displayed on the MFD screen 145, which invites the mobile communications device 220 to form the hybrid device.

The mobile communications device 220 has to elect to join by utilizing the displayed code 250. Note that in some embodiments the random code 250 can be, for example, a QR code/PIN number combination or a NFC (Near-Field Communication) chip, depending upon design considerations. In general, NFC is a set of standards for Smartphone and similar devices to establish radio communication with each other by touching them together or bringing them into close proximity, usually no more than a few centimeters. QR Code (abbreviated from Quick Response Code) is the trademark for a type of matrix barcode (or two-dimensional) code. The code consists of black modules (square dots) arranged in a square pattern on a white background. The information encoded can be made up of four standardized kinds ("modes") of data (numeric, alphanumeric, byte/binary, Kanji), or through supported extensions, virtually any kind of data.

The random code 250 can be implemented as any code that is visually displayed and is not limited to the use of QR codes. Other codes include, for example, 1D (One-Dimensional) stripe bar codes such UPC-A, Xerox Glyph Marks, 2D (Two-Dimensional) codes, and 3D (Three-Dimensional) codes such as Secure Seal, along with many others. It is important to appreciate, however, that such codes are not limited to visually-displayable codes, but may also be implemented in the context of dynamic codes through, for example, a NFC/RFID that requires contact or close physical proximity to read (e.g., through a Smartphone's NFC reader), then this is equivalent to the "random code" discussed herein. If the mobile device can be physically inserted into a slot to read a value (e.g. a USB slot) or via a cable (e.g., retractable cable) this constitutes the same concept: exchanging the key via close physical proximity.

Figure 8:
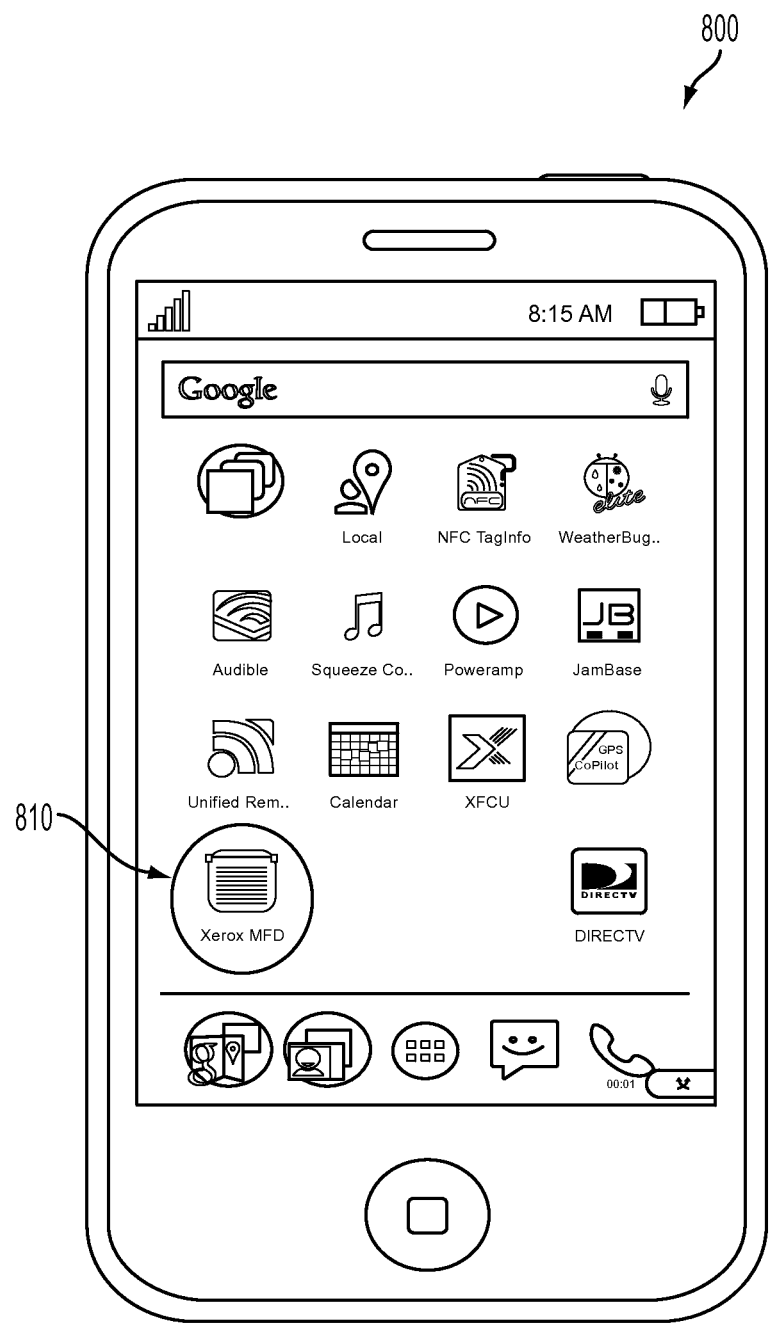
FIG. 8 illustrates a GUI of the mobile communications device showing an application to connect to the MFD, in accordance with the disclosed embodiments.

FIG. 8 illustrates a GUI 800 of the mobile communications device 220 showing an application 810 to connect to the MFD 140, in accordance with the disclosed embodiments. The user starts the application 810 on the mobile communications device 220 to connect to the MFD 140. The mobile communications device 220 reads the displayed QR code 250 using an image-capturing unit (not shown) associated with the mobile communications device 220. The mobile communications device 220 can also read the code 250 from a continuous video displayed on the MFD 140 or from the NFC chip and so on.

Figure 9:
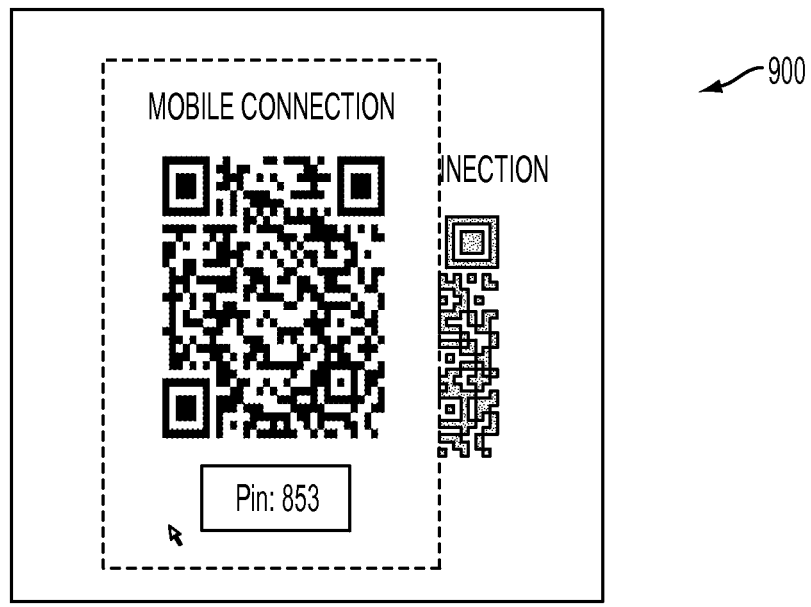
FIG. 9 illustrates a GUI of the mobile communications device showing the code, in accordance with the disclosed embodiments.

FIG. 9 illustrates a GUI 900 of the mobile communications device 220 showing the code 250, in accordance with the disclosed embodiments. The mobile communications device 220 and the MFD 140 establish a connection utilizing the random code 250 that has been transferred. The session is one-off and can expire after a period of inactivity. The connection requires physical proximity to be established to prevent unwanted access to the MFD 140 from other parties.

Figure 10:
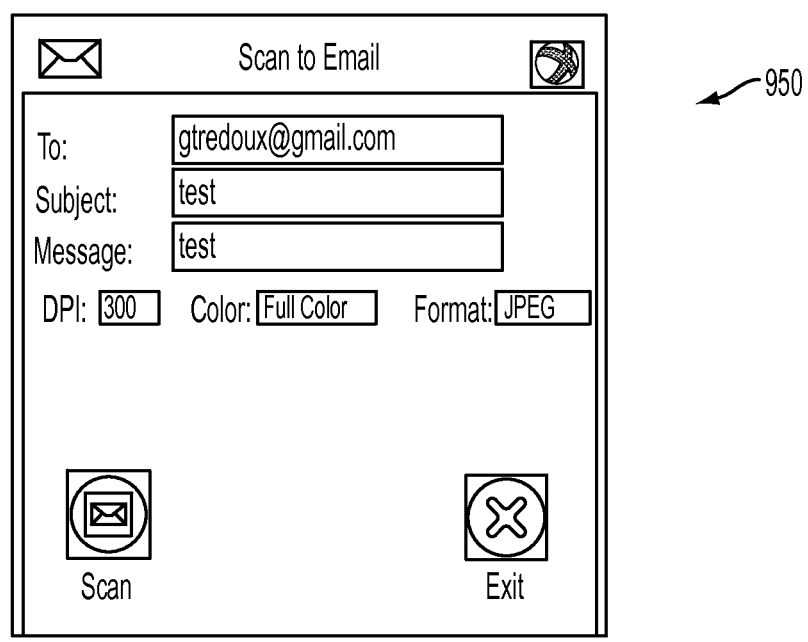
FIG. 10 illustrates a GUI of an extensibility application displayed on the mobile communications device and/or the MFD, in accordance with the disclosed embodiments.

FIG. 10 illustrates a GUI (Graphical User Interface) 950 of an extensibility application displayable on a display screen of the mobile communications device 220 and/or the MFD 140, in accordance with the disclosed embodiments. The MFD extensibility application module 240 can be executed and can have access to both the services on the MFD 140 and the services and sensors on the mobile communications device 220. For example, the application module can initiate a scan operation (which will execute on the MFD) and retrieve GPS coordinates (which will execute on the mobile) to bundle with the scan images to a remote destination to be processed. FIG. 10 illustrates a "Scan2Email" EIP application running on the mobile communications device 220, in accordance with an example embodiment. The extensibility application is a hybrid application because it can treat the platform it is running on as composed of both mobile services and sensors and MFD 140 services and functions.

When the extensibility application 240 exits, the session may either be torn down or allowed to expire due to inactivity, depending on user preferences. If the extensibility application 240 is run on the MFD 140 without involving the mobile communications device 220, it simply loses access to the extra resources offered by the mobile communications device 220, and may degrade gracefully to offer say only scanning without GPS coordinates.

It will be appreciated that variations of the above-disclosed and other features and functions, or alternatives thereof, may be desirably combined into many other different systems or applications. For example, the VPN technique discussed herein using QR codes and rendezvous, etc., is simply one way of establishing a VPN. Other techniques and approaches can also be implemented in accordance with varying embodiments. The various presently unforeseen or unanticipated alternatives, modifications, variations or improvements therein may be subsequently made by those skilled in the art are also intended to be encompassed by the following claims.

What is claimed is:

1. A method for extending a multi-function device to a mobile communications device, comprising:

combining an extensibility application associated with and executed upon a multi-function device including printer hardware with an execution environment with respect to a mobile communications device within physical proximity to said multi-function device to offer a plurality of services including printing wherein said extensibility application comprises access to services on said multi-function device by said mobile communications device and access to services and sensors on said mobile communications device by said multi-function device;

connecting said mobile communications device and said multi-function device utilizing a random code displayed on a graphical user interface of said multi-function device wherein said random code is at least one of read by or entered on said mobile communications device; and integrating hardware, comprising said printer hardware, and software resources of said multi-function device and said mobile communications device to perform a plurality of composite operations involving data from said multi-function device and said mobile communications device.

2. The method of claim 1 wherein said plurality of services comprises at least one of the following types of services:

a scan by an optical scanner integrated in said multi-function device;

a facsimile by the printer hardware integrated in said multi-function device;

a voice recording by a microphone integrated in said mobile communications device;

a global positioning system service associated with said mobile communications device utilized to set a Simple Network Management Protocol location configuration of said multi-function device;

a print service by the printer hardware integrated in said multi-function device; and a copy service by the printer hardware and the optical scanner integrated in said multi-function device.

3. The method of claim 1 further comprising:

calling a reference service that is automatically run on a correct hardware if said extensibility application is executed; and transparently and automatically tunneling said reference service through said rendezvous point from said mobile communications device to said multi-function device.

4. The method of claim 3 further comprising:

directly connecting said mobile communications device and said multi-function device if said multi-function device is too primitive to have an extensibility framework of its own.

5. The method of claim 4 further comprising running said extensibility application on said mobile communications device inside a web browser and transparently rewriting an Extensibility API request to said multi-function device services.

6. The method of claim 5 further comprising employing a translation service in combination with said web browser on said mobile communications device to perform a URL rewriting on said extensibility application by correctly routing a call to a correct destination.

7. The method of claim 6 further comprising:

displaying said multi-function device extensibility application on said user interface of said mobile communications device and/or said multi-function device; and executing said extensibility application to access said plurality of services on said multi-function device and service and sensor on said mobile communications device.

8. The method of claim 7 wherein said extensibility application loses access to an extra resource offered by said mobile communications device and degrade gracefully if said extensibility application is run on said multi-function device without involving said mobile communications device.

9. The method of claim 8 further comprising tunneling back a call to said mobile communications device and run there if said extensibility application is displayed on said user interface of said multi-function device screen with a reverse direction.

10. A system for extending a multi-function device to a mobile communications device, said system comprising:
a processor;
a data bus coupled to said processor;
a location determination module; and
a non-transitory computer-usable medium embodying computer program code, said non-transitory computer-usable medium being coupled to said data bus, said computer program code comprising instructions executable by said processor and configured for:
combining an extensibility application associated with and executed upon a multi-function device including printer hardware with an execution environment with respect to a mobile communications device within physical proximity to said multi-function device to offer a plurality of services including printing wherein said extensibility application comprises access to services on said multi-function device by said mobile communications device and access to services and sensors on said mobile communications device by said multi-function device;
connecting said mobile communications device and said multi-function device utilizing a random code displayed on a graphical user interface of said multi-function device, wherein connection is achieved when at least one of said mobile communications device reads said random code or said random code is entered on said communications device; and
integrating hardware, comprising said printer hardware, and software resources of said multi-function device and said mobile communications device to perform a plurality of composite operations involving data from said multi-function device and said mobile communications device.

11. The system of claim 10 wherein said plurality of services comprises at least one of the following types of services:
a scan by an optical scanner integrated in said multi-function device;
a facsimile by the printer hardware integrated in said multi-function device;
a voice recording by a microphone integrated in said mobile communications device;
a global positioning system service;
a print service by the printer hardware integrated in said multi-function device; and
a copy service by the printer hardware and the optical scanner integrated in said multi-function device.

12. The system of claim 10 wherein said instructions are further configured for:
calling a reference service that is automatically run on a correct hardware if said extensibility application is executed; and
transparently and automatically tunneling said reference service through said rendezvous point from said mobile communications device to said multi-function device.

13. The system of claim 12 wherein said instructions are further configured for:
directly connecting said mobile communications device and said multi-function device if said multi-function device is too primitive to have an extensibility framework of its own.

14. The system of claim 13 wherein said instructions are further configured for running said extensibility application on said mobile communications device inside a web browser and transparently rewriting an Extensibility API request to said multi-function device services.

15. The system of claim 14 wherein said instructions are further configured for employing a translation service in combination with said web browser on said mobile communications device to perform a URL rewriting on said extensibility application by correctly routing a call to a correct destination.

16. The system of claim 15 wherein said instructions are further configured for:
displaying said multi-function device extensibility application on said user interface of said mobile communications device and/or said multi-function device; and
executing said extensibility application to access said plurality of services on said multi-function device and service and sensor on said mobile communications device.

17. The system of claim 16 wherein said extensibility application loses access to an extra resource offered by said mobile communications device and degrade gracefully if said extensibility application is run on said multi-function device without involving said mobile communications device.

18. The system of claim 17 wherein said instructions are further configured for tunneling back a call to said mobile communications device to said mobile communications device and run there if said extensibility application is displayed on said user interface of said multi-function device screen with a reverse direction.

19. A non-transitory processor-readable medium storing computer code representing instructions to cause a process for extending a multi-function device to a mobile communications device, said computer code comprising code to:
combine an extensibility application associated with and executed upon a multi-function device including a scanner, printer and user interface with an execution environment with respect to a mobile communications device within physical proximity to said multi-function device to offer a plurality of services including printing wherein said extensibility application comprises access to services on said multi-function device by said mobile communications device and access to services and sensors on said mobile communications device by said multi-function device;
connect said mobile communications device and said multi-function device utilizing a random code displayed on a graphical user interface of said multi-function device, wherein connection is achieved when at least one of said mobile communications device reads said random code or said random code is entered on said communications device; and integrate hardware, comprising said printer hardware, and software resources of said multi-function device and said mobile communications device to perform a plurality of composite operations involving data from said multi-function device and said mobile communications device.

20. The non-transitory processor-readable medium of claim 19 wherein said code further comprises code to:
call a reference service that is automatically run on a correct hardware if said extensibility application is executed; and
transparently and automatically tunnel said reference service through said rendezvous point from said mobile communications device to said multi-function device.

* * * * *